US008301301B2

(12) United States Patent
Edwards

(10) Patent No.: US 8,301,301 B2
(45) Date of Patent: Oct. 30, 2012

(54) DISTRIBUTED ITEM DISPENSER MANAGEMENT

(75) Inventor: Thomas V. Edwards, Suwanee, GA (US)

(73) Assignee: NCR Corporation, Duluth, GA (US)

( * ) Notice: Subject to any disclaimer, the term of this patent is extended or adjusted under 35 U.S.C. 154(b) by 55 days.

(21) Appl. No.: 12/914,580

(22) Filed: Oct. 28, 2010

(65) Prior Publication Data

US 2012/0109372 A1 May 3, 2012

(51) Int. Cl.
*G06F 17/00* (2006.01)
(52) U.S. Cl. ......... 700/241; 700/236; 700/242; 700/244
(58) Field of Classification Search ................. 700/236, 700/237, 241, 242, 244; 235/381; 705/16
See application file for complete search history.

(56) References Cited

U.S. PATENT DOCUMENTS

| 5,028,766 | A  | * | 7/1991  | Shah            | 235/381 |
| 5,482,139 | A  | * | 1/1996  | Rivalto         | 235/383 |
| 6,415,555 | B1 | * | 7/2002  | Montague        | 700/236 |
| 6,708,879 | B2 | * | 3/2004  | Hunt            | 235/385 |
| 6,997,375 | B1 | * | 2/2006  | Green et al.    | 235/379 |
| 7,072,737 | B2 | * | 7/2006  | Lunak et al.    | 700/236 |
| 7,234,609 | B2 | * | 6/2007  | DeLazzer et al. | 221/10  |
| 7,728,711 | B2 | * | 6/2010  | Shoenfeld       | 700/237 |
| 7,860,606 | B2 | * | 12/2010 | Rudy            | 700/242 |
| 2003/0212471 | A1 | * | 11/2003 | Chakravarti   | 700/241 |
| 2004/0254676 | A1 | * | 12/2004 | Blust et al.  | 700/231 |

* cited by examiner

*Primary Examiner* — Timothy Waggoner
(74) *Attorney, Agent, or Firm* — Joseph P. Merhle

(57) ABSTRACT

Systems and techniques for distributed dispenser management are provided. A list of item selections is received, the list including at least one item with an item type. A collection of one or more dispenser groups may be identified, where each dispenser group in the collection includes a unique combination of one or more item dispensers with a combined unreserved inventory sufficient to dispense each item in the list. An item dispenser group may then be selected from the collection based on even depletion. The items in the list may be reserved from the selected dispenser group.

21 Claims, 4 Drawing Sheets

DISTRIBUTED ITEM DISPENSER MANAGEMENT

BACKGROUND

Retailers have long attempted to solve the problem of safeguarding high-value items from thieves while reducing sales staff. Generally, a retailer will keep the high-value items in a locked cabinet and have an employee remove the item in accordance with a customer request. The customer is then expected to proceed to the checkout and pay for the item. Several drawbacks are present in using locked cabinets, including: increased staff to manage the cabinet and serve customer requests; the possibility of theft, by the customer, between the receipt of an item from the cabinet and the checkout; and the possibility of theft by an employee with access to the cabinet.

SUMMARY

In various embodiments, systems and methods for distributed dispenser management are presented. According to an embodiment, a method for distributed dispenser management is provided. In a system having a plurality of item dispensers, a list of item selections is received, the list of item selections including at least one item with an item type. A collection of one or more item dispenser groups is then identified. Each item dispenser group in the collection is a unique combination of one or more item dispensers, and each item dispenser group having sufficient combined unreserved inventory to dispense each item from the list. An item dispenser group from the collection of item dispenser groups may then be selected based on even depletion. Finally, items in the list may be reserved in the one or more item dispensers in the selected item group.

BRIEF DESCRIPTION OF THE DRAWINGS

Some embodiments are illustrated by way of example and not limitation in the figures of the accompanying drawings in which.

DETAILED DESCRIPTION

Figure 1:
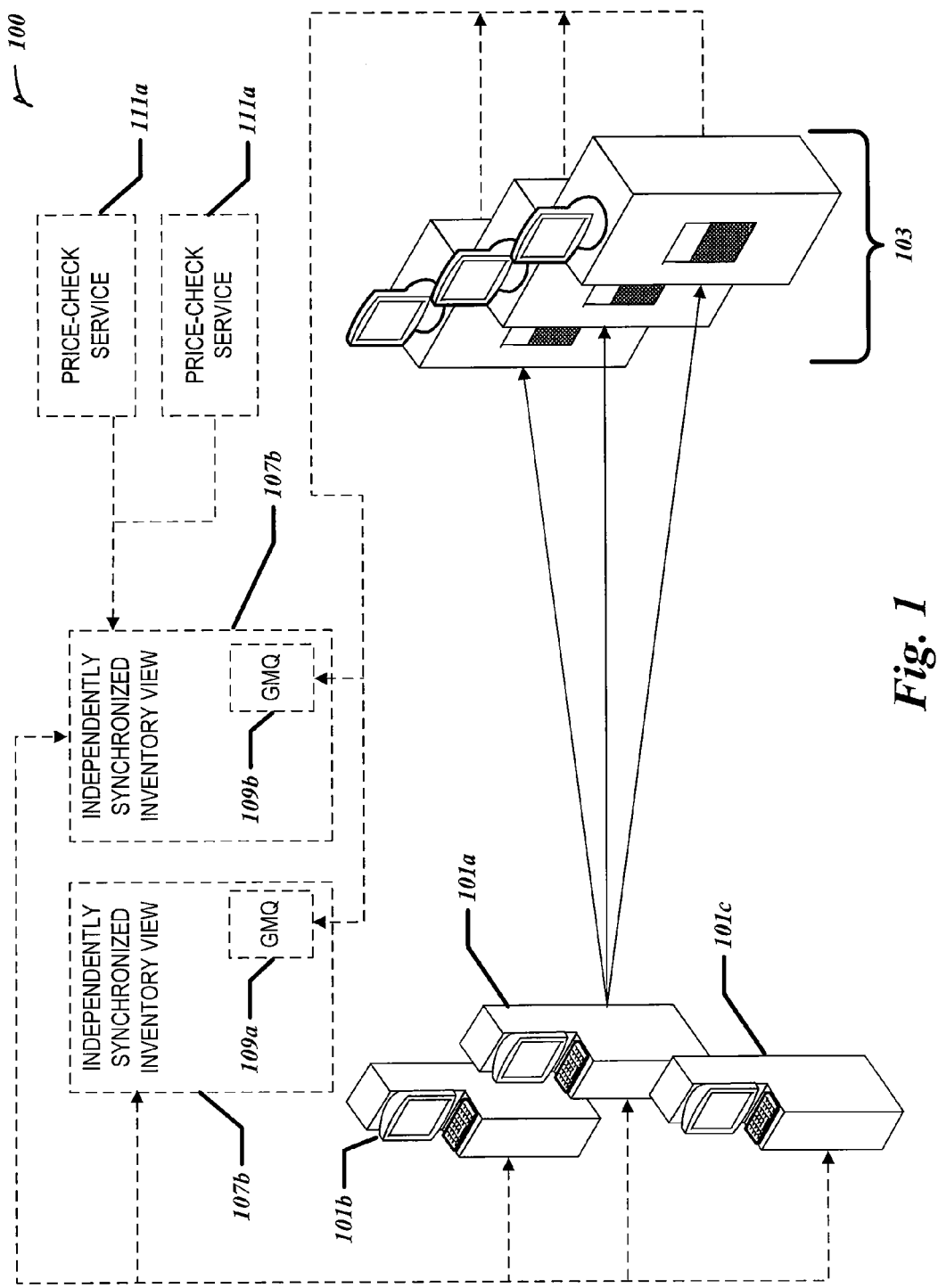
FIG. 1 is a block diagram illustrating an example system for distributed item dispenser management according to one embodiment.

Example methods and systems for centralized user preference management for electronic decision making devices are described. In the following description, for purposes of explanation, numerous specific details are set forth in order to provide a thorough understanding of an embodiment of the present disclosure. It will be evident, however, to one of ordinary skill in the art that the present disclosure may be practiced without these specific details.

Retailers may employ item dispenser devices to combat the problems of securing high value items from theft. Browse and pay stations ("B&P stations") may accomplish the complete sale of the items, including, in some examples, selecting items based on promotional materials, product descriptions, pictures, categories, and price among other factors. The B&P stations may then interface with one or more item dispensers to dispense the items to a customer. In some examples, the B&P station may issue a physical token, or receipt, to the customer which is then take by an item dispenser to dispense the items. In some examples, the B&P station communicates directly with the item dispensers to immediately dispense the items. In some examples, the B&P station may reserve the items in the item dispensers and the customer may then retrieve the items by presenting identification. By removing employees from the purchase of high value (and other) items, retailers may reduce losses due to theft and damage associated with employee handling of the items.

Systems with more than one item dispenser coupled to one or more B&P stations may, however, experience several problems. One possible problem is which item dispenser should be used by the B&P station to dispense an item. Another possible problem is the location of item inventory information such that the item inventory information is centralized and available to B&P stations to facilitate the purchase of items by customers as well as item dispenser selection to dispense the items purchase by the customer. A third possible problem is maintaining up-to-date pricing information for the items inventoried in the item dispensers.

The first problem identified above may be dealt with by instructing B&P stations to select item dispenser groups to dispense the items based on even depletion. Even depletion may, in some examples, entail choosing the smallest number of item dispensers to fulfill a customer's order, and then choosing among available item dispensers those with the highest unreserved inventory of the items selected by the customer, and then avoiding the depletion of any one item in any one item dispenser. Thus, more item dispensers may conveniently fulfill a customer's order while reducing replenishment frequency. In some examples, B&P stations may recognize low inventory levels in item dispensers and trigger replenishment. In some examples, B&P station item operations against inventory in item dispensers may be accomplished through a reserve system, where operations, such as an item dispense operation, are first reserved and then carried out. In some examples, reserved inventory items are considered dispensed for B&P item operations. In this way, multiple B&P stations may not interfere with each other's operations.

The second above identified problem may be dealt with using multiple independently synchronized ("MIS") views within the same store as the B&P stations and item dispensers. B&P stations which lose access to item dispenser inventory information may not be able to operate and thus lose business for the retailer. By keeping the MIS views within the same store, a retailer can avoid the frequent interruptions associated with wide area network ("WAN") lookups to a central inventory repository. Also, by independently synchronizing the MIS views, a retailer may avoid the expense hardware and software associated with traditional high-availability systems. In some examples, independent synchronization for the MIS views may include inventorying the item dispensers, and then messaging each item dispense and load operation, by each item dispenser, to each of the MIS views using a guaranteed delivery mechanism. MIS views may then be updated after certain events, such as an item dispenser failure, or the addition of a new item dispenser. The MIS views may, in some examples, reside on different hardware to provide greater protection against failure. Further, in some examples, the B&P stations may make information requests to all MIS views simultaneously. In some examples the MIS views respond to the B&P requests in a hierarchical order, where lower MIS views on the hierarchy respond after a predetermined period of non-response by the MIS views higher in the hierarchy. In this way, a reliable and affordable centralized view of item dispenser (and in some examples store) inventory may be maintained to facilitate the B&P station operations.

The third above identified problem, that of maintaining current pricing information for items in item dispensers, may be dealt with using a price-check service. The price-check service may maintain a current price for each item, or item type, inventoried in the item dispensers. After an event, such as an item replenishment, or a pre-defined period has elapsed, the price-check service may update price information for the items. In some examples, the price information is updated in the B&P stations. In some examples, the price information is updated in the MIS views. In some examples, there are multiple price-check services each residing on separate hardware to increase uptime and availability. By using the price-check service, a retailer may help to ensure that the current prices are applied to items in item dispensers, even if the B&P stations are not connected to the store's point-of-sale system.

FIG. 1 is a block diagram illustrating an example system 100 for distributed item dispenser management according to one embodiment. System 100 may include one or more B&P stations 101a-c and a plurality of item dispensers 103. In some examples, System 100 may optionally include a plurality of MIS views 107a-b, each having a guaranteed communication delivery system 109a-b. System 100 may also optionally include a plurality of price-check services 111a-b, which may, in some examples, be communicatively coupled to the plurality of MIS views 107a-b.

B&P station 101a may control the item dispensers 103 along with B&P stations 101b-c. In some examples, B&P station 101a may include a user interface through which a customer may browse and or purchase items. B&P station 101a may, in some examples, accept a list of items to purchase from the customer and complete the transaction. In some examples, B&P station 101a may interface with the store's point-of-sale system to lookup item information, and to complete the transaction. In some examples, the B&P station 101a may request item information from an alternate source, such as the MIS views 107a-b and interface with a different payment application to complete the sale. In some examples, the B&P station 101a may reserve the items in the list from the customer in the item dispensers 103. In some examples, B&P station 101a reserves the items in the MIS views 107a-b. In some examples, reserved items may be considered dispensed, or otherwise unavailable for subsequent B&P station 101a-c item operations. In some examples, after reserving the items, B&P station 101a issues a physical token to the customer. In some examples, B&P station 101a may be communicatively coupled (e.g., via a network or direct connection) to the item dispensers 103. In some examples, B&P station 101a may direct one or more of the item dispensers 103 to dispense the items in the list selected by the customer. In some examples, B&P stations 101a-c may be communicatively coupled to the plurality of MIS views 107a-b. In some examples, B&P station 101a may reserve item selections in the MIS views 107a-b before item dispensers 103 dispense the items. In some examples, B&P stations 101a-c may receive inventory information for the item dispensers 103 from the plurality of MIS views 107a-b. In some examples B&P stations 101a-c may send an inventory information request to MIS view 107a and 107b simultaneously. In some examples, B&P stations 101a-c do not communicate with each other. In some examples, B&P stations 101a-c may be any device capable of completing a user transaction for items stored in the item dispensers 103 and reserving those items for the customer.

B&P stations 101a-c may select item dispensers 103 to dispense purchase items based on even depletion. In some examples, even depletion uses the fewest number of dispensers (preferably one) to dispense the list of items purchase by the customer. In some examples, even depletion may then select the item dispensers 103 which both of the greatest inventories of the items on the list, while avoiding complete depletion (zero inventory) of any one item type in any one item dispenser 103.

B&P stations 101a-c may also recognize low item inventories in the item dispensers 103 and trigger an item replenishment process. In some examples, replenishment may be linked to profiles that are historic sales curves typical of the category of item, or type of item. For example, given a history of sales by item code, a sales volume profile may exist. The profile may be expressed as a curve with time on the 'x' axis and sales volume on the 'y' axis. The sales history may locate the individual item is on the curve and the scale for the profile. In some examples, profile curves may be established by historical data or a particular item type, or a category of item types, or other measures associated with the particular item type. One or several profiles may exist based on the nature of the product, and discriminates may exist that assign specific products to different sales profiles. For example, the sales profile of a perfume would naturally be different than that of a video game, and within video games those of interest to middle age male audience might be different than female child audience.

Product sales curves may be developed through historic data analysis. An example highly anticipated product may begin high and taper off over time. A less anticipated product may start lower, and rise and then taper off after a popularity peak. A product subjected to recurrent marketing campaigns, may remain steady generally, but peak during a given marketing campaign. Generally, in each of the hypothetical curves above, scale may be determined in both the 'x' and 'y' axis. That is, the curve may be calibrated to the particular item demand data both in peak units sold and product sales life. This data is again determined from sales profile data based on the categorization of the item against historic item sale trends for like items. The sales profile model may then provide a prediction of the sales volume as a function of time for each dispenser item code. The sales profile may be used to drive the replenishment model and also to provide thresholds for low item level alarms for item counts as a function of the expected sales profile, volume and time scale of the particular item.

Item dispensers 103 dispense items to the customer after the items are purchased at a B&P station 101a. In some examples, item dispensers 103 may have an inventory of more than one item type. For example, if the item dispenser 103 dispenses DVDs, it may contain more than one DVD title. In another example, an item dispenser 103 may contain DVDs and portable DVD players. In some examples, item dispensers 103 may contain more than one item of each item type. In some examples, item dispensers 103 may be communicatively coupled to the plurality of MIS views 107a-b. In some examples, item dispensers 103 may include software and hardware to iterate through each item slot, identify the item contained therein, and communicate with the MIS views 107a-b about the contents of each item slot. In some examples, item dispensers 103 may include the software and hardware to communicate each item dispense and load operation to the MIS views 107a-b. In some examples, item dispensers 103 may accept a physical token and dispense items indicated on the token. For example, a B&P station 101a may issue a receipt to the customer after the customer's purchase. The receipt may include optical indicators of the items purchased. The customer may then take the receipt over to an item dispenser 103, insert the receipt, and the item dispenser 103 will dispense the items indicated on the receipt. In some examples, the token may be electronic, whereby the customer identifies himself with, for example, a major credit card, at an item dispenser 103 and the items are dispensed. In some examples, the item dispenser 103 simply dispenses items when instructed to do so by a B&P station 101a-c.

The optional MIS views 107a-b may respond to B&P station 101a requests for item dispenser inventory information. In some examples, MIS views 107a-b may be maintained in a hierarchy. In some examples, a higher order (higher in the hierarchy) MIS view 107a may respond instead of a lower order MIS view 107b. In some examples, a lower order MIS view 107b may wait a predetermined period to respond if the higher order MIS view 107a has not responded. In some examples, the lower order MIS view 107b may wait a predetermined period of time for each MIS view 107a superior in the hierarchy to MIS view 107b. For example, if MIS views 107a-b receive a request along with a primary MIS view which is not shown, MIS view 107b may wait two predetermined time period to answer the request. In some examples, more than one MIS view 107a-b may exist at each level of the hierarchy.

MIS views 107a-b may include an associated guaranteed message delivery mechanism ("GMQ"), shown here as 109a and 109b respectively. In some examples, the GMQ 109a-b may be a message queue. In some examples GMQ 109a-b may be any number of commercially available asynchronous messaging options that include a guaranteed delivery mechanism. In some examples, the existence of messages in, for example, GMQ 109a indicates that MIS view 107a is not synchronized, or is stale. In some examples, MIS view 107a may not respond to inventory information requests if it is stale.

The optional price-check services 111a-b may each run on individual hardware (computer) in order to help ensure uptime and availability. Optional price-check services 111a-b may include hardware and software to update item prices in the inventory information maintained in the MIS views 107a-b, or the B&P stations 101a-c. In some examples, price-check services 111a-b receive item price information directly, through a user interface managed by the price-check services 111a-b. In some examples, the price-check services 111a-b are updated by an external service, such as a central pricing authority. In some examples, price-check services 111a-b include hardware and software to query, or request, item price information from one or more external sources. In some examples, price-check services 111a-b are configured to perform an update of item price information at a pre-defined period. In some examples, the pre-defined period may include, the start of the day, after a shift, each hour, or any other period of time relevant in the price changes for an item (e.g., items with rapidly varying prices may be "price checked" more frequently). In some examples, price-check services 111a-b update the item price information when an item dispenser 103 is replenished.

Figure 2:
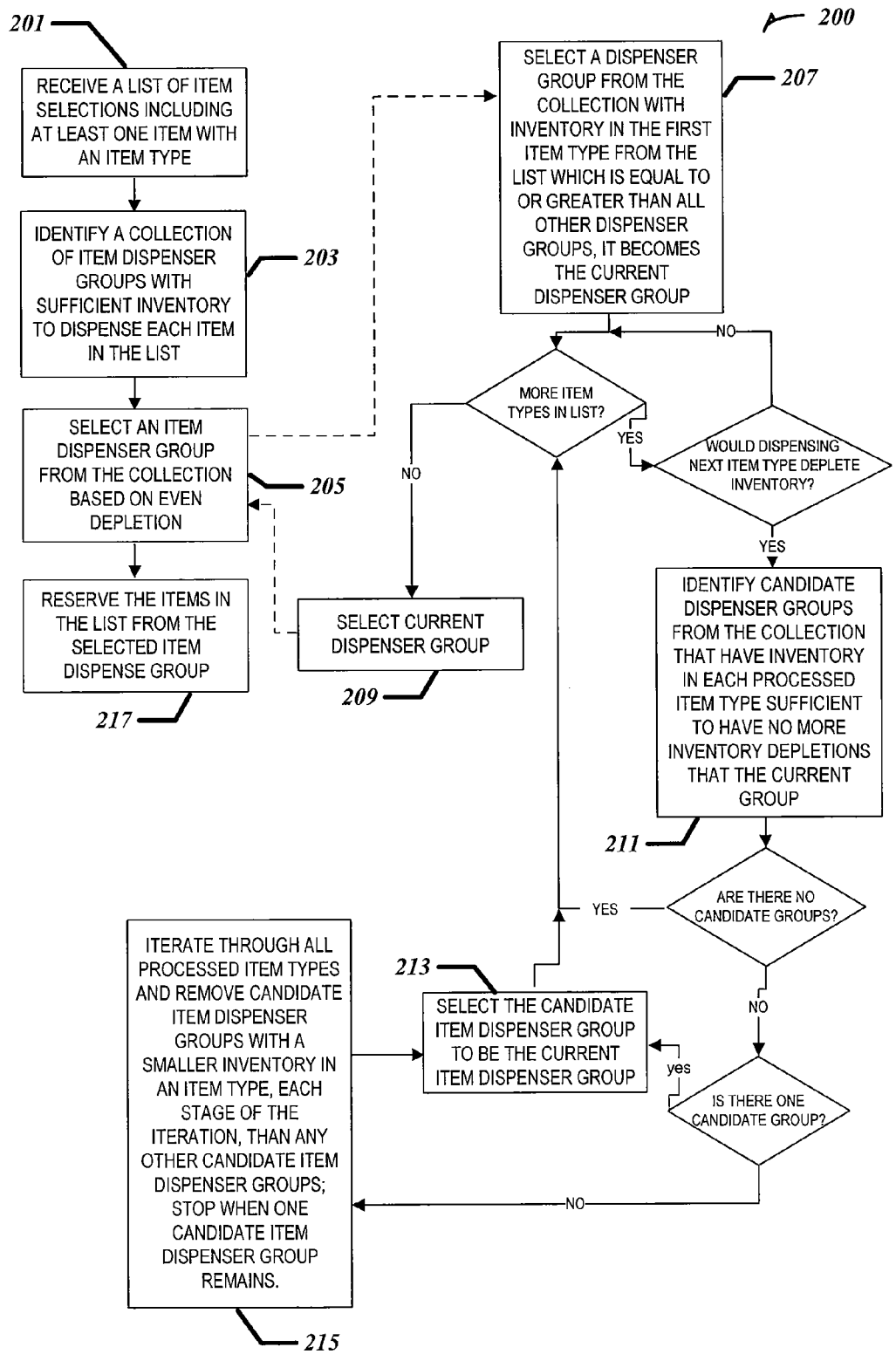
FIG. 2 is a flowchart illustrating an example method for distributed item dispenser management according to one embodiment.

FIG. 2 is a flowchart illustrating an example method 200 for distributed item dispenser management according to one embodiment. Some components from system 100 may be used for below for illustrative purposes, however it will be understood that other components may be used to perform method 200. Method 200 may be performed in a system with a plurality of item dispensers 103.

At 201 a list of item selections may be received, the list including at least one item with an item type. In some examples, the list of item selections is a list of items purchased by a customer at a B&P station 101.

At 203 a collection of one or more item dispenser groups is identified, each item dispenser group in the collection being a unique combination of one or more item dispensers 103 having a combined inventory sufficient to dispense each item in the list of items. For example, if there are three dispensers 103, A, B, and C, and A has two each of items X and Y, B has two each of Items Y and Z, and C has three of item W, a list with two of item Y and one of item W, then the dispenser groups may be the following {A, C} or {B, C}. In some examples the identification may be carried out by a B&P station 101. In some examples, the item dispenser inventory information to identify the item dispenser groups in the collection may be obtained from a plurality of MIS views 107. In some examples, gather information from the MIS views 107 may be performed according to method 310 illustrated below with respect to FIG. 3. In some examples, identifying the collection of item dispenser groups may trigger item replenishment for item dispensers 103 with low item levels. Item replenishment may be as previously discussed with respect to FIG. 1. Item replenishment may include recommending replenishment of items at low levels based on one or more sales volume profiles associated with one or more item categories. In some examples, the item categories correspond to item type. In some examples, the item categories may include several different item types with related characteristics (two different DVD titles have a relation of both being DVDs).

At 205 an item dispenser group from the collection identified at 203 is selected based on even depletion. In some examples, even depletion entails selecting the smallest number of item dispensers 103 to dispense the items of the list, then selecting item dispensers 103 with the greatest inventory in the item types found on the list while avoiding completely depleting the inventory of any given item type in an given item dispenser 103. In some examples, operations 207209 may perform a form of selecting an item dispenser group from the collection based on even depletion.

At 207 an item dispenser group from the collection is selected to be the current dispenser group. The selected dispenser group has an inventory in the first item type from the list greater than or equal to all other dispenser groups in the collection. In some examples, if more than one dispenser group has the maximum inventory in the first item type from the list, one may be selected at random. In some examples, a more sophisticated tie-breaking mechanism may be used, such as, selecting the dispenser group with the greatest overall inventory of all item in the list. In some examples, only unreserved inventory is considered if item reservations are in place. For example, an item dispenser 103 with two A items, and one of the A items is reserved, would be considered to have an inventory of one item for the purposes of 207-209.

At 209 if, at any time, there are no more item types in the list, select the current dispenser group to be the selected item dispenser group at 205.

If there are more item types in the list, will dispensing the next item type completely deplete the inventory of the next item type for an item dispenser 103 in the current dispenser group? If not, proceed to checking whether more item types are in the list.

At 211, if dispensing the next item type would deplete the inventory in the next item type for an item dispenser 103 in the current dispenser group, identify candidate dispenser groups from the collection of item dispenser groups that have inventory in each processed item type (i.e., an item type that has either been the first item type or a next item type previous to the current next item type) sufficient to have no more inventory depletions (i.e., no more item dispensers 103 have an item type reduced to zero inventory) than the current dispenser group. For example, the current dispenser group may have the inventory of two item dispensers 103 reduced to zero (for the same or different item types). Thus, any dispenser group in the collection of dispenser groups may be selected that have zero, one, or two item dispensers 103 reduced to zero in one item, or one item dispenser 103 reduced to zero in two items, etc. The goal is to maintain some inventory in all item types in all item dispensers 103 if possible.

If there are no candidate dispenser groups, i.e., the set of candidate groups is empty, proceed above with checking whether more item types are in the list.

If there is one candidate dispenser group, at 213, select the candidate dispenser group to be the current dispenser group.

If there are more than one candidate dispenser groups, at 215, reduce the set of candidate dispenser groups by iterating though all processed item types. Pick some order to iterate through the processed item types. In some examples, the processed item types are iterated in the reverse order in which they were originally processed. For example, if item types A, B, and C were processed in that order, the iteration will begin with item C, then proceed to B, and finally to A. At each iteration, remove item dispenser groups from the candidate dispenser groups with a smaller inventory in the current item type than any other dispenser group in the set of candidate dispenser groups.

If the set of candidate dispenser groups is reduced to one, proceed to 213.

If the set of candidate groups completely iterates through the processed item types and more than one candidate dispenser group remains, perform a tie-break operation to select one and proceed to 213. In some examples, the tie-break operation may be a random selection of one of the candidate dispenser groups. In some examples, the tie-break operation may be based on other criteria, such as total inventory, expense in replenishment, etc.

At 217 the items in the list of items purchased by the customer are reserved from the selected item dispenser group from 205. In some examples, the reservation is made at each of the item dispensers 103 in the selected item dispenser group. In some examples, the reservation is made at one or more HIS views 107. In some examples, reserved items are considered dispensed, or otherwise unavailable, for subsequent item operations by, for example, B&P stations 101. In some examples, following reservation of the items, a B&P station 101 may direct the item dispensers 103 in the selected item dispenser group to dispense the items to the customer.

Figure 3A:
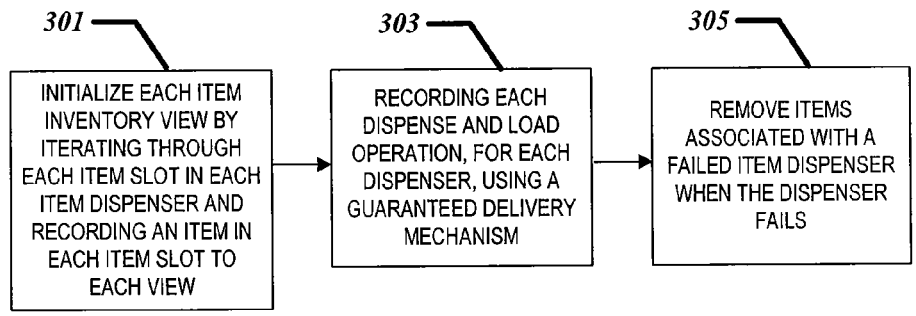
FIG. 3a is a flowchart illustrating an example method for maintaining independent synchronized inventory views with a store according to one embodiment.

By using even depletion, customers may have the convenience of using the fewest number of item dispensers 103 to get the items they purchased, while the retailer FIG. 3a is a flowchart illustrating an example method 300 for maintaining independent synchronized inventory views with a store according to one embodiment. Method 300 may be used to independently synchronize two or more inventory views. In some examples, method 300 may be used to create and maintain a plurality of HIS views 107.

At 301 initialize each item inventory view 107 by iterating through each item slot in each item dispenser 103 and recording an item, or lack thereof, in each item slot to the item inventory view 107.

At 303 recording each dispense and load operation of each item dispenser 103 at each of the item inventory views 107 using a guaranteed delivery mechanism. In some examples, a guaranteed delivery mechanism may be any of several commercially available asynchronous messaging systems with facilities to guarantee message delivery. In some examples, a guaranteed delivery mechanism simply includes features to store and transmit a message until the recipient receives the message. In some examples, messages waiting to be delivered to an item inventory view indicates that the item inventory view is stale.

At 305 items associated with a failed item dispenser 103 may be removed from each of the item inventory views 107 when an item dispenser 103 fails.

In this manner, two or more item inventory views may maintain up-to-date information for the inventories of the item dispensers 103. Method 300 may also allow a retailer to achieve high-availability with the inventory views 107 without the expense of traditional high-availability hardware configurations.

Figure 3B:
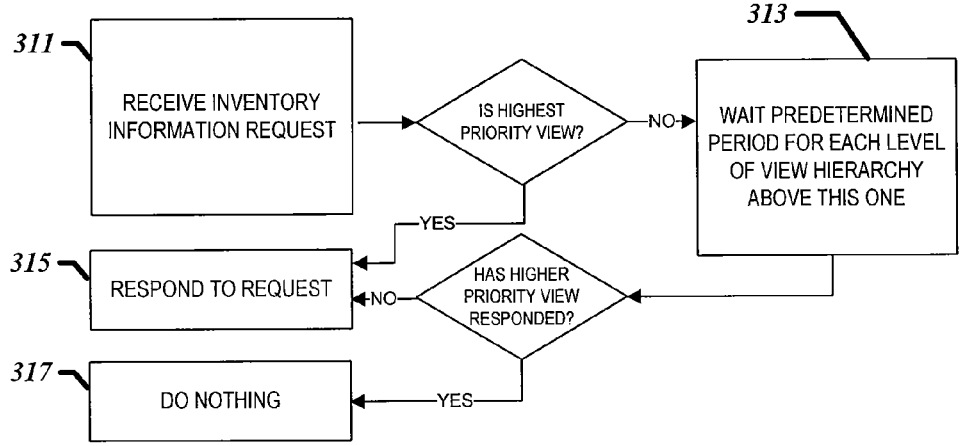
FIG. 3b is a flowchart illustrating an example method for responding to inventory information requests according to one embodiment.

FIG. 3b is a flowchart illustrating an example method 310 for responding to inventory information requests according to one embodiment. In some examples, method 310 may be used to request inventory information for the item dispensers 103 by the B&P stations 101.

At 311 an inventory information request is received at each MIS view 107. In some examples, the request is directly addressed to each of the MIS views 107. In some examples, the request is addressed to a message distribution device (e.g., BigIP) to retransmit the request to each of the plurality of MIS views 107.

If a particular MIS view 107 is the highest priority MIS view 107, at 315 the MIS view 107 responds to the request. In some examples, if the MIS view 107 is stale, it refrains from responding to the request. In some examples, the MIS views 107 are arranged in a hierarchy, with lower MIS views 107 on the hierarchy having a lower priority.

If a particular MIS view 107 is a lower priority MIS view 107, at 313, wait a predetermined period of time. In some examples, the lower priority MIS view 107 may wait a multiple of the predetermined period of time equal to its level in the hierarchy. For example, if the MIS view 107 is one the third tier of the hierarchy, and the predetermined period of time is five milliseconds, then the MIS view 107 may wait 10 milliseconds.

After waiting, if a higher priority MIS view 107 has responded, then at 317 the lower priority MIS view 107 does nothing.

After waiting, if a higher priority MIS view 107 has not responded, then at 315 the lower priority MIS view 107 responds as the high priority MIS view 107 does as previously described.

Method 310 allows the MIS views 107 to timely respond to inventory requests while avoiding stale data.

Figure 3C:
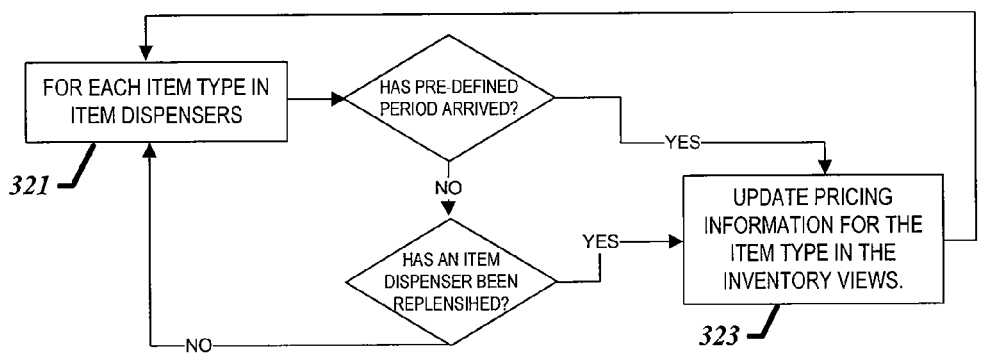
FIG. 3c is a flowchart illustrating an example method for updating item pricing information according to one embodiment.

FIG. 3c is a flowchart illustrating an example method 320 for updating item pricing information according to one embodiment. Method 320 may maintain up-to-date pricing information for the items within item dispensers 103. Method 320 may be performed on the plurality of price-check services 111.

At 321, for each item type in the item dispensers 103, determine if a pre-defined period has arrived. In some examples, the pre-defined period may be the beginning of a day, at the beginning or end of a shift, each hour, etc. In some examples, the pre-defined period is specific to each item type. In some examples, the pre-defined period is shorter for item types with high price volatility. In some examples, the pre-defined period is specific to item categories associated with the item types.

If the pre-defined period has not arrived, determine whether an item dispenser 103 been replenished. If not, proceed to 321.

If either the pre-defined time period has arrived, or an item dispenser 103 has been replenished, at 323 update the pricing information for the item type in the inventory views. In some examples, the pricing information is updated in the plurality of MIS views 107. In some examples the updating occurs in the B&P stations 101.

Figure 4:
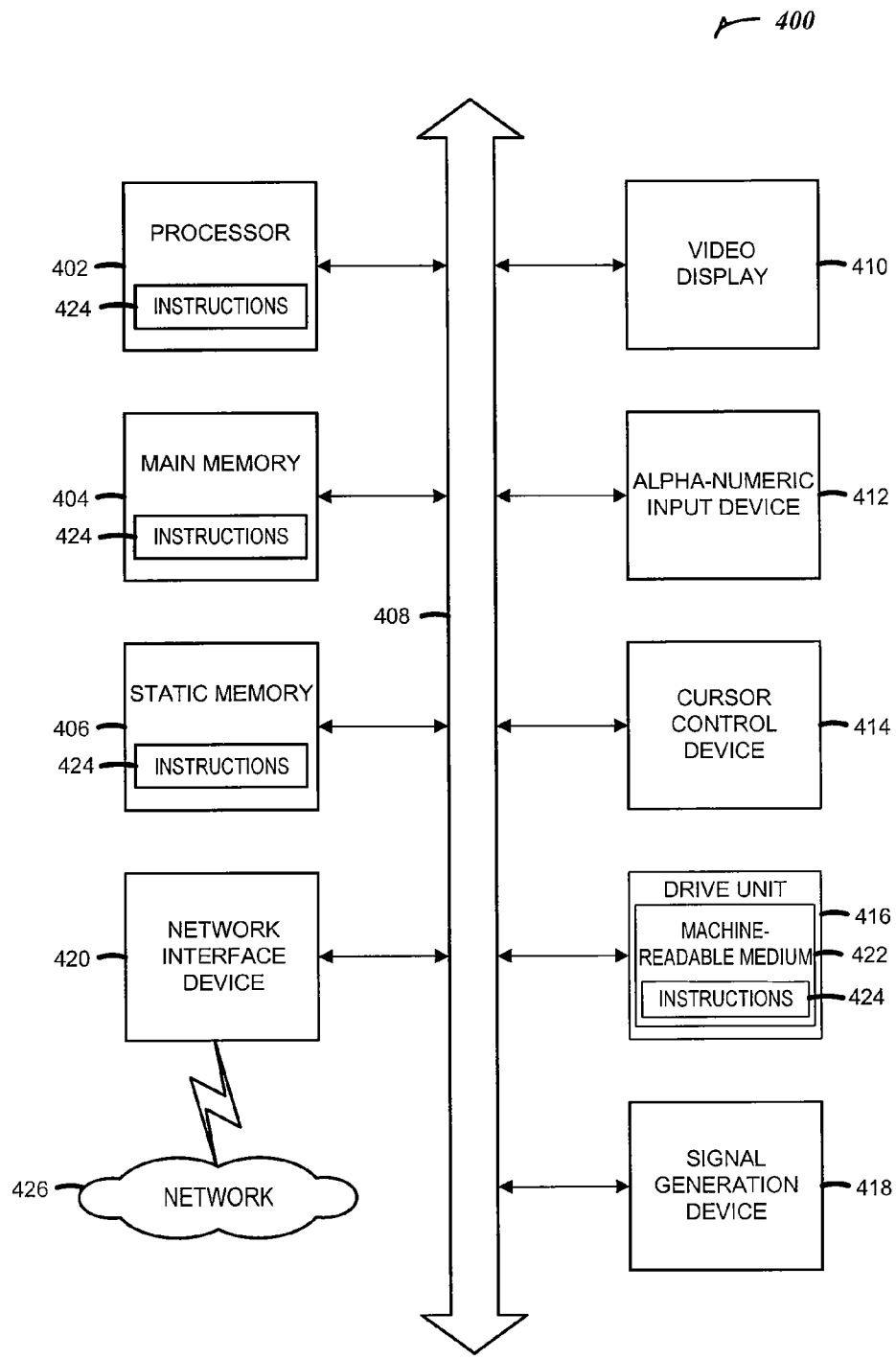
FIG. 4 is a diagrammatic representation illustrating a machine in the example form of a computer system which may be may be part of an example embodiment.

FIG. 4 shows a diagrammatic representation of machine in the example form of a computer system 400 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 400 includes a processor 402 (e.g., a central processing unit (CPU) a graphics processing unit (GPU) or both), a main memory 404 and a static memory 406, which communicate with each other via a bus 408. The computer system 400 may further include a video display unit 410 (e.g., a liquid crystal display (LCD) or a cathode ray tube (CRT)). The computer system 400 also includes an alphanumeric input device 412 (e.g., a keyboard), a cursor control device 414 (e.g., a mouse), a disk drive unit 416, a signal generation device 418 (e.g., a speaker) and a network interface device 420.

The disk drive unit 416 includes a machine-readable medium 422 on which is stored one or more sets of instructions (e.g., software 424) embodying any one or more of the methodologies or functions described herein. The software 424 may also reside, completely or at least partially, within the main memory 404 and/or within the processor 402 during execution thereof by the computer system 400, the main memory 404 and the processor 402 also constituting machine-readable media.

The software 424 may further be transmitted or received over a network 426 via the network interface device 420.

While the machine-readable medium 422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the inventive subject matter. The term "machine-readable medium" shall accordingly be taken to include, but not be limited to, solid-state memories, optical and magnetic media, and carrier wave signals. The term "tangible machine-readable medium" shall be taken to include, machine-readable media that is in tangible form, including, but not limited to, solid-state memories, optical media, and magnetic media.

The Abstract of the Disclosure is provided to comply with 37 C.F.R. §1.72(b), requiring an abstract that will allow the reader to quickly ascertain the nature of the technical disclosure. It is submitted with the understanding that it will not be used to limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A system comprising:
   a plurality of item dispensers, item dispensers in the plurality of item dispensers being physically separate from each other;
   one or more self-service checkout terminals, each of the one or more self-service checkout terminals including one or more hardware processors and a user interface configured to receive a list of item selections, the list including at least one item with an item type, and each of the one or more self-service checkout terminals configured to:
      identify a collection of one or more item dispenser groups, each item dispenser group in the collection being a unique combination of one or more item dispensers from the plurality of item dispensers with a combined unreserved inventory sufficient to dispense each item in the list;
      select an item dispenser group from the collection based on even depletion; and
      reserve the items in the list from the selected item dispenser group.

2. The system of claim 1, wherein to select a item dispenser group from the collection based on even depletion comprises:
   to select, from the collection, a current item dispenser group having an unreserved inventory in a first item type from the list greater than or equal to all other item dispenser groups in the collection;
   if the list has more than one item type, to process each additional item type from the list until all item types in the list are processed, to process each additional item type from the list comprising:
      to select a next item type from the list, the next item type being unprocessed;
      if dispensing, items associated with the next item type from the current item dispenser group would deplete the current item dispenser group's unreserved inventory in the next item type, to identify candidate item dispenser groups, from the collection, each candidate item dispenser group having unreserved inventory in each processed item type sufficient to have no more item type depletions than the current item dispenser;

if there is one candidate item dispenser group, to select the candidate item dispenser group to be the current item dispenser group; and if there are a plurality of candidate item dispenser groups, to iterate through all processed item types to remove candidate item dispenser groups when a candidate item dispenser group has a smaller unreserved inventory for a current processed item type than any other candidate item dispenser groups and, after iterating though all processed item types, to select a remaining candidate item dispenser group to be the current item dispenser group; and to select the current item dispenser group.

3. The system of claim 1, wherein the self-service checkout terminal is further configured to trigger item replenishment in one or more item dispensers in the plurality of item dispensers when low item levels are detected in the one or more item dispensers.

4. The system of claim 3, wherein to trigger item replenishment includes recommending replenishment of items at low levels based on one or more sales volume profiles associated with one or more item categories, the one or more item categories also being associated with the items at low levels.

5. The system of claim 1, further comprising a plurality of independently synchronized item views each residing on a different computer from any other independently synchronized item view, the independently synchronized item views being in a store which also contains the plurality of item dispensers, each of the plurality of independently synchronized item views configured to:

initialize by iterating through each item slot in each item dispenser in the plurality of item dispensers and recording an item in each item slot to the view; and removing items associated with a failed item dispenser when the failed item dispenser fails; and wherein each of the plurality of item dispensers is configured to transmit each item dispense and load operation to each of the plurality of independently synchronized item views; and wherein the one or more self-service checkout terminals is further configured to request unreserved inventory information of an item dispenser in the plurality of item dispensers from the plurality of independently synchronized item views.

6. The system of claim 5, further comprising a guaranteed delivery mechanism associated with each of the plurality of independently synchronized item views to deliver messages;

wherein to request unreserved inventory information includes to request inventory information from all of the plurality of independently synchronized item views;

wherein the plurality independently synchronized item views are arranged in a hierarchy;

wherein the plurality of independently synchronized item views are further configured to respond to the request after a predetermined period of time following a allure of an immediately superior view to respond to the request; and wherein an unsynchronized view is excluded from the request, a unsynchronized view being a view in the plurality of independently synchronized item views having an associated guaranteed delivery mechanism with undelivered messages.

7. The system of claim 5, further comprising a plurality of price-check services each residing on a different computer from any other price-check service, each of the plurality of price-check services configured to:

run at pre-defined periods to update, in each of the plurality of independently synchronized item views, pricing information for each item type in the plurality of item dispensers; and update, in each of the plurality of independently synchronized item views, pricing information for each item type that is new in an item dispenser in the plurality of item dispensers following replenishment.

8. In a system with a plurality of item dispensers that are physically separate from each other, a method comprising:

receiving, using one or more hardware processors, a list of item selections, the list including at least one item with an item type;

identifying a collection of one or more item dispenser groups, each item dispenser group in the collection being a unique combination of one or more item dispensers from the plurality of item dispensers with a combined unreserved inventory sufficient to dispense each item in the list;

selecting an item dispenser group from the collection based on even depletion; and reserving the items in the list from the selected item dispenser group.

9. The method of claim 8, wherein selecting an item dispenser group from the collection based on even depletion comprises:

selecting, from the collection, a current item dispenser group having an unreserved inventory in a first item type from the list greater than or equal to all other item dispenser groups in the collection;

if the list has more than one item type, processing each additional item type from the list until all item types in the list are processed, the processing comprising:

selecting a next item type from the list, the next item type being unprocessed;

if dispensing items associated with the next item type from the current item dispenser group would deplete the current item dispenser group's unreserved inventory in the next item type, identifying candidate item dispenser groups, from the collection, each candidate item dispenser group having unreserved inventory in each processed item type sufficient to have no more item type depletions than the current item dispenser group;

if there is one candidate item dispenser group, selecting the candidate item dispenser group to be the current item dispenser group; and if there are a plurality of candidate item dispenser groups, iterating through all processed item types to remove candidate item dispenser groups when a candidate item dispenser group has a smaller unreserved inventory for a current processed item type than any other candidate item dispenser groups and, after iterating though all processed item types, selecting a remaining candidate item dispenser group to be the current item dispenser group; and selecting the current item dispenser group.

10. The method of claim 8, wherein identifying a collection of one or more item dispenser groups includes triggering item replenishment in one or more item dispensers in the plurality of item dispensers when low item levels are detected in the one or more item dispensers.

11. The method of claim 10, wherein triggering item replenishment includes recommending replenishment of items at low levels based on one or more sales volume profiles associated with one or more item categories, the one or more item categories also being associated with the items at low levels.

12. The method of claim 8, wherein inventory information of an item dispenser in the plurality of item dispensers is requested from a plurality of independently synchronized views, the independently synchronized views each residing on a different computer, the independently synchronized views being in a store which also contains the plurality of item dispensers, the method of synchronizing the independently synchronized views comprising:
   initializing each view in the plurality of independently synchronized views by iterating through each item slot in each item dispenser in the plurality of item dispensers and recording an item in each item slot to the view;
   removing items associated with a failed item dispenser when the failed item dispenser fails; and
   recording each item dispense and item load operation, for each item dispenser in the plurality of item dispensers, to each of the plurality of independently synchronized views, the recording including sending each item dispense and item load operation from an item dispenser via a guaranteed delivery mechanism.

13. The method of claim 12, wherein the inventory information is requested from all of the plurality of independently synchronized views, the independently synchronized views being in a hierarchy and responding to the request based on the hierarchy, subordinate views in the hierarchy responding to the request after a predetermined period of time following a failure of an immediately superior view to respond to the request, a view in the hierarchy being unsynchronized when a guaranteed delivery mechanism associated with the view includes outstanding messages, an unsynchronized view being excluded from the request.

14. The method of claim 12, wherein pricing information for each item type in the plurality of item dispensers is updated in the plurality of independently synchronized views by a plurality of price-check services, the price-check services each residing on a different computer, the price-check services running at pre-defined periods and when an item dispenser in the plurality of item dispensers is replenished.

15. A non-transitory machine readable medium including instructions that, when executed by a processor, perform a method, the method comprising:
   receiving, using one or more hardware processors, a list of item selections, the list including at least one item with an item type;
   identifying a collection of one or more item dispenser groups, each item dispenser group in the collection being a unique combination of one or more item dispensers from the plurality of item dispensers with a combined unreserved inventory sufficient to dispense each item in the list, item dispensers in the plurality of item dispensers being physically separate from each other;
   selecting an item dispenser group from the collection based on even depletion; and
   reserving the items in the list from the selected item dispenser group.

16. The non-transitory machine readable medium of claim 15, wherein selecting an item dispenser group from the collection based on even depletion comprises:
   selecting, from the collection, a current item dispenser group having an unreserved inventory in a first item type from the list greater than or equal to all other item dispenser groups in the collection;
   if the list has more than one item type, processing each additional item type from the list until all item types in the list are processed, the processing comprising:
      selecting a next item type from the list, the next item type being unprocessed;
      if dispensing items associated with the next item type from the current item dispenser group would deplete the current item dispenser group's unreserved inventory in the next item type, identifying candidate item dispenser groups, from the collection, each candidate item dispenser group having unreserved inventory in each processed item type sufficient to have no more item type depletions than the current item dispenser group;
      if there is one candidate item dispenser group, selecting the candidate item dispenser group to be the current item dispenser group; and
      if there are a plurality of candidate item dispenser groups, iterating through all processed item types to remove candidate item dispenser groups when a candidate item dispenser group has a smaller unreserved inventory for a current processed item type than any other candidate item dispenser groups and, after iterating though all processed item types, selecting a remaining candidate item dispenser group to be the current item dispenser group; and
   selecting the current item dispenser group.

17. The non-transitory machine readable medium of claim 15, wherein identifying a collection of one or more item dispenser groups includes triggering item replenishment in one or more item dispensers in the plurality of item dispensers when low item levels are detected in the one or more item dispensers.

18. The non-transitory machine readable medium of claim 17, wherein triggering item replenishment includes recommending replenishment of items at low levels based on one or more sales volume profiles associated with one or more item categories, the one or more item categories also being associated with the items at low levels.

19. The non-transitory machine readable medium of claim 15, wherein inventory information of an item dispenser in the plurality of item dispensers is requested from a plurality of independently synchronized views, the independently synchronized views each residing on a different computer, the independently synchronized views being in a store which also contains the plurality of item dispensers, the method of synchronizing the independently synchronized views comprising:
   initializing each view in the plurality of independently synchronized views by iterating through each item slot in each item dispenser in the plurality of item dispensers and recording an item in each item slot to the view;
   removing items associated with a failed item dispenser when the failed item dispenser fails; and
   recording each item dispense and item load operation, for each item dispenser in the plurality of item dispensers, to each of the plurality of independently synchronized views, the recording including sending each item dispense and item load operation from an item dispenser via a guaranteed delivery mechanism.

20. The non-transitory machine readable medium of claim 19, wherein the inventory information is requested from all of the plurality of independently synchronized views, the independently synchronized views being in a hierarchy and responding to the request based on the hierarchy, subordinate views in the hierarchy responding to the request after a predetermined period of time following a failure of an immediately superior view to respond to the request, a view in the hierarchy being unsynchronized when a guaranteed delivery mechanism associated with the view includes outstanding messages, an unsynchronized view being excluded from the request.

21. The non-transitory machine readable medium of claim 19, wherein pricing information for each item type in the plurality of item dispensers is updated in the plurality of independently synchronized views by a plurality of price-check services, the price-check services each residing on a different computer, the price-check services running at predefined periods and when an item dispenser in the plurality of item dispensers is replenished.

\* \* \* \* \*